United States Patent
Yi et al.

(10) Patent No.: US 8,958,352 B2
(45) Date of Patent: Feb. 17, 2015

(54) METHOD AND APPARATUS FOR REPORTING LOCATION INFORMATION

(71) Applicant: LG Electronics Inc., Seoul (KR)

(72) Inventors: Seung June Yi, Anyang-si (KR); Sung Duck Chun, Anyang-si (KR); Sung Hoon Jung, Anyang-si (KR); Young Dae Lee, Anyang-si (KR); Sung Jun Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/235,754

(22) PCT Filed: Sep. 18, 2012

(86) PCT No.: PCT/KR2012/007464
§ 371 (c)(1),
(2) Date: Jan. 28, 2014

(87) PCT Pub. No.: WO2013/048050
PCT Pub. Date: Apr. 4, 2013

(65) Prior Publication Data
US 2014/0169320 A1    Jun. 19, 2014

Related U.S. Application Data

(60) Provisional application No. 61/541,099, filed on Sep. 30, 2011, provisional application No. 61/539,955, filed on Sep. 27, 2011.

(51) Int. Cl.
*H04B 7/00* (2006.01)
*H04W 4/00* (2009.01)
*H04J 3/24* (2006.01)
*H04M 11/04* (2006.01)
*H04W 24/00* (2009.01)
*H04W 64/00* (2009.01)
*H04W 24/10* (2009.01)
*H04W 72/04* (2009.01)

(52) U.S. Cl.
CPC .............. *H04W 64/00* (2013.01); *H04W 24/10* (2013.01); *H04W 72/0413* (2013.01)
USPC ..... 370/310.2; 370/338; 370/349; 455/404.2; 455/456.1

(58) Field of Classification Search
USPC .......................... 370/310–350; 455/456.1–466
See application file for complete search history.

(56) References Cited

U.S. PATENT DOCUMENTS 7,978,616 B2 * 7/2011 Chun et al. .................. 370/242
8,031,600 B2 * 10/2011 Wu ............................. 370/231
8,355,331 B2 * 1/2013 Chun et al. .................. 370/242

(Continued)

OTHER PUBLICATIONS

Xenakis, et al., "Alternative Schemes for Dynamic Secure VPN Deployment in UMTS," Wireless Personal Communications (2006) 36, DOI: 10.1007 /sl 1277-006-8864-9, Springer 2006, pp. 163-194 (relevant portions: abstract p. 178, lines 3-21).

*Primary Examiner* — Tri H Phan
(74) *Attorney, Agent, or Firm* — Lee, Hong, Degerman, Kang & Waimey

(57) ABSTRACT

A method and apparatus for reporting location information are provided. A wireless device transmits a Packet Data Convergence Protocol (PDCP) control Protocol Data Unit (PDU) to a base station. The PDCP control PDU includes a D(Data)/C(Control) field indicating a control PDU, a PDU type field indicating location information and the location information of the wireless device.

14 Claims, 9 Drawing Sheets

(56) References Cited

U.S. PATENT DOCUMENTS

2010/0041418 A1* 2/2010 Edge et al. ................ 455/456.2
2010/0284278 A1 11/2010 Alanara
2014/0219181 A1* 8/2014 Chun et al. .................... 370/328

* cited by examiner

METHOD AND APPARATUS FOR REPORTING LOCATION INFORMATION

CROSS-REFERENCE TO RELATED APPLICATIONS

This application is the National Stage filing under 35 U.S.C. 371 of International Application No. PCT/KR2012/007464, filed on Sep. 18, 2012, which claims the benefit of U.S. Provisional Application Ser. Nos. 61/539,955, filed on Sep. 27, 2011, and 61/541,099, filed on Sep. 30, 2011, the contents of which are all hereby incorporated by reference herein in their entirety.

BACKGROUND OF THE INVENTION

1. Field of the Invention

The present invention relates to wireless communications, and more particularly, to a method and apparatus for reporting location information in a wireless communication system.

2. Related Art

3rd generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

Minimization of driving tests (MDT) is a test performed by operators for coverage optimization by using a user equipment (UE) instead of using an automobile. A coverage varies depending on a location of a base station, deployment of buildings nearby, a user's usage environment, etc. Therefore, it is required for the operators to periodically perform the driving test, and a lot of costs and resources are consumed. The MDT is used when the operator measures the coverage by using the UE.

One of the objectives of the MDT is Quality of Service (QoS) verification. Usage of UE specific QoS measurements is to verify performance relevant to end user perception. This also allows detecting critical conditions and determining the need to change the network configuration, parameter settings or capacity extension. Operators may use this information to assess the actual QoS experienced by the end user, check whether the actual QoS meets the planning target, and find critical factors determining actual QoS. Operators may also use this information together with the location information to draw a QoS map of the cell.

Logging of data volume for a given Data Radio Bearer can be used to derive the user throughput. The data volume can be defined in terms of number of bytes of Packet Data Convergence Protocol (PDCP) Service Data Unit (SDU) in the logging period.

One of parameters for QoS verification is a QoS benchmarking map. The QoS benchmarking map is used to verify actual throughput which is guaranteed to the UE at each location of a cell and is used to check how much amount of data is uploaded or downloaded at each location of the cell. From the view of operators, it is important to get accurate QoS benchmarking map in order to guarantee proper QoS.

UE's location information has been reported to a network in various ways. For example, the UE's location information is used to manage UE's paging group. Generally, the location information is transmitted as a Radio Resource Control (RRC) message and is not related to data volume or QoS verification.

There is a need to report location information which is associated with QoS verification.

SUMMARY OF THE INVENTION

The present invention provides a method and apparatus for reporting location information in a wireless communication system.

In an aspect, a method for reporting location information in a wireless communication system is provided. The method includes transmitting a Packet Data Convergence Protocol (PDCP) control Protocol Data Unit (PDU) to a base station. The PDCP control PDU includes a D(Data)/C(Control) field indicating a control PDU, a PDU type field indicating location information and the location information of the wireless device.

The PDCP control PDU may further include a length field indicating a length in bytes of the PDCP control PDU.

In another aspect, a wireless device configured for reporting location information in a wireless communication system is provided. The wireless device includes a radio frequency unit configured to receive and transmit a radio signal, and a processor, operably coupled with the radio frequency unit, configured to transmit a Packet Data Convergence Protocol (PDCP) control Protocol Data Unit (PDU) to a base station. The PDCP control PDU includes a D(Data)/C(Control) field indicating a control PDU, a PDU type field indicating location information and the location information of the wireless device.

To get QoS benchmarking map, location information associated with PDCP SDUs is provided. A network knows where the UE transmits PDCP SDUs or where the UR receives PDCP SDUs.

DESCRIPTION OF EXEMPLARY EMBODIMENTS

A wireless device may be fixed or mobile, and may be referred to as another terminology, such as a user equipment (UE), a mobile station (MS), a user terminal (UT), a subscriber station (SS), a mobile terminal (MT), etc. A base station may be generally a fixed station that communicates with the wireless device and may be referred to as another terminology, such as an evolved node-B (eNB), a base transceiver system (BTS), an access point, etc.

Hereinafter, it is assumed that a wireless communication system is based on 3rd Generation Partnership Project (3GPP) Long Term Evolution (LTE) or 3GPP LTE-Advanced (LTE-A). However, the wireless communication system to which the present invention is applied is not limited to the 3GPP LTE/LTE-A system. Thus, the present invention may be applicable to various wireless communication systems.

Figure 1:
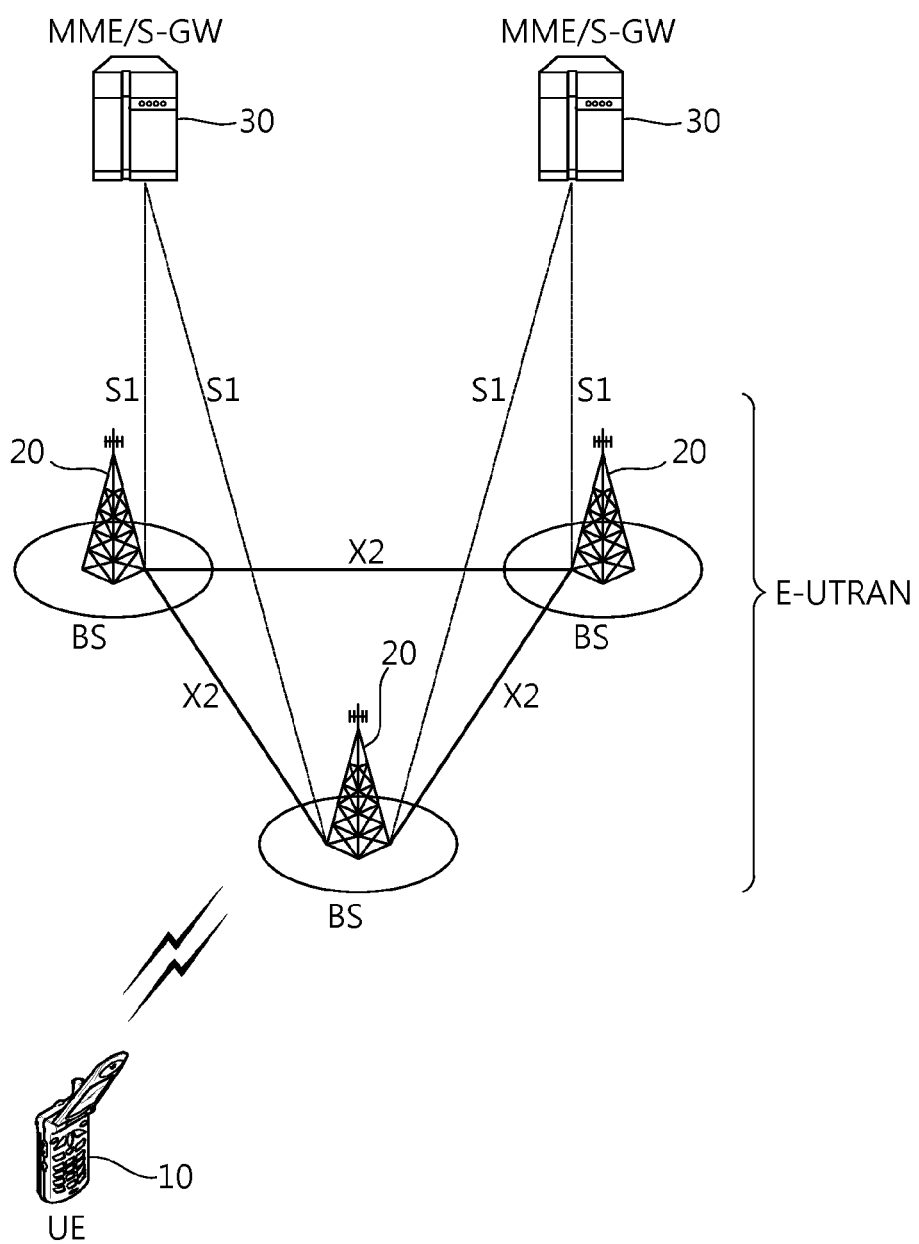
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a LTE/LTE-A system.

The E-UTRAN includes at least one base station (BS) 20 which provides a control plane and a user plane to a user equipment (UE) 10. The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW).

The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
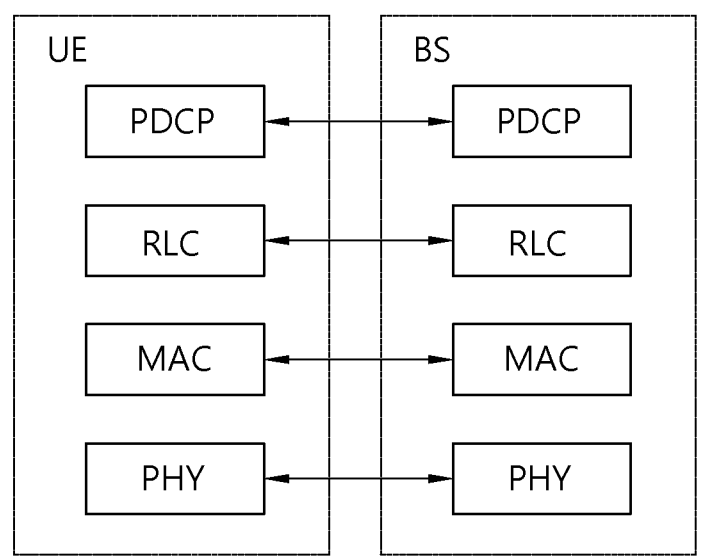
FIG. 2 is a diagram showing a radio protocol architecture for a user plane.
Figure 3:
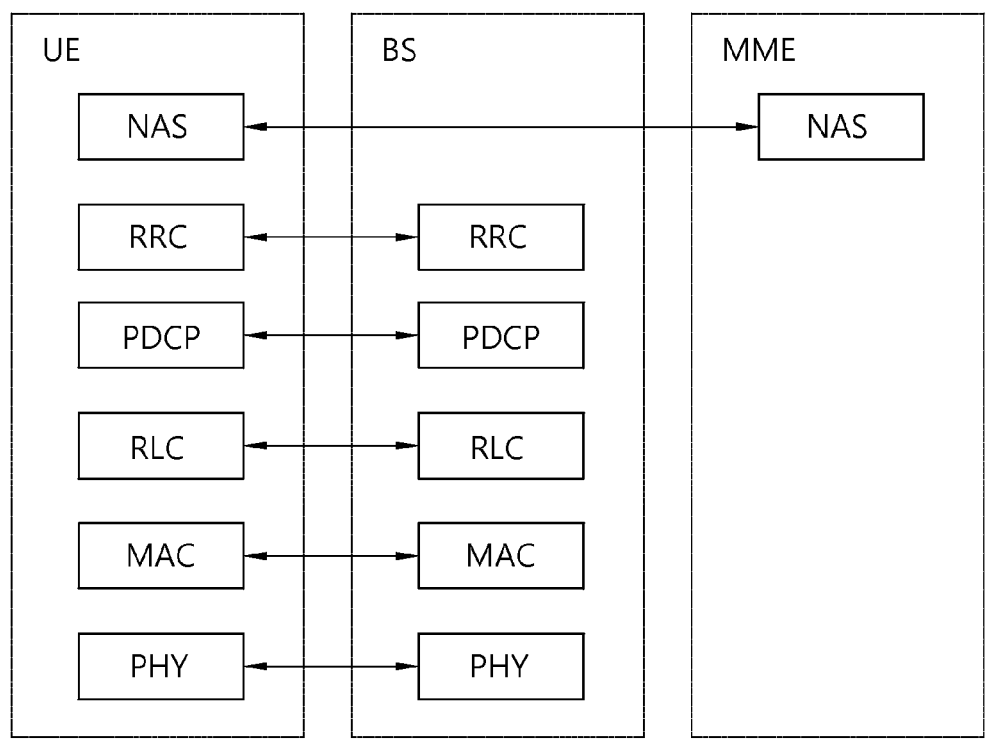
FIG. 3 is a diagram showing a radio protocol architecture for a control plane.

FIG. 2 is a diagram showing a radio protocol architecture for a user plane. FIG. 3 is a diagram showing a radio protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Between different PHY layers, i.e., a PHY layer of a transmitter and a PHY layer of a receiver, data is transferred through the physical channel. The physical channel may be modulated using an orthogonal frequency division multiplexing (OFDM) scheme, and may utilize time and frequency as a radio resource.

Functions of the MAC layer include mapping between a logical channel and a transport channel and multiplexing/demultiplexing on a transport block provided to a physical channel over a transport channel of a MAC service data unit (SDU) belonging to the logical channel. The MAC layer provides a service to a radio link control (RLC) layer through the logical channel.

Functions of the RLC layer include RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The UM RLC receives SDUs from the higher layers and segments the SDUs into appropriate RLC PDUs without adding any overhead. The AM RLC provides retransmission by using an automatic repeat request (ARQ). The UM RLC does not provide retransmission.

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs). An RB is a logical path provided by the first layer (i.e., the PHY layer) and the second layer (i.e., the MAC layer, the RLC layer, and the PDCP layer) for data delivery between the UE and the network.

The setup of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state (also may be referred to as an RRC connected mode), and otherwise the UE is in an RRC idle state (also may be referred to as an RRC idle mode).

Data is transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several subcarriers in a frequency domain. One subframe includes a plurality of OFDM symbols in the time domain. A resource block is a resource allocation unit, and includes a plurality of OFDM symbols and a plurality of subcarriers. Further, each subframe may use particular subcarriers of particular OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 4:
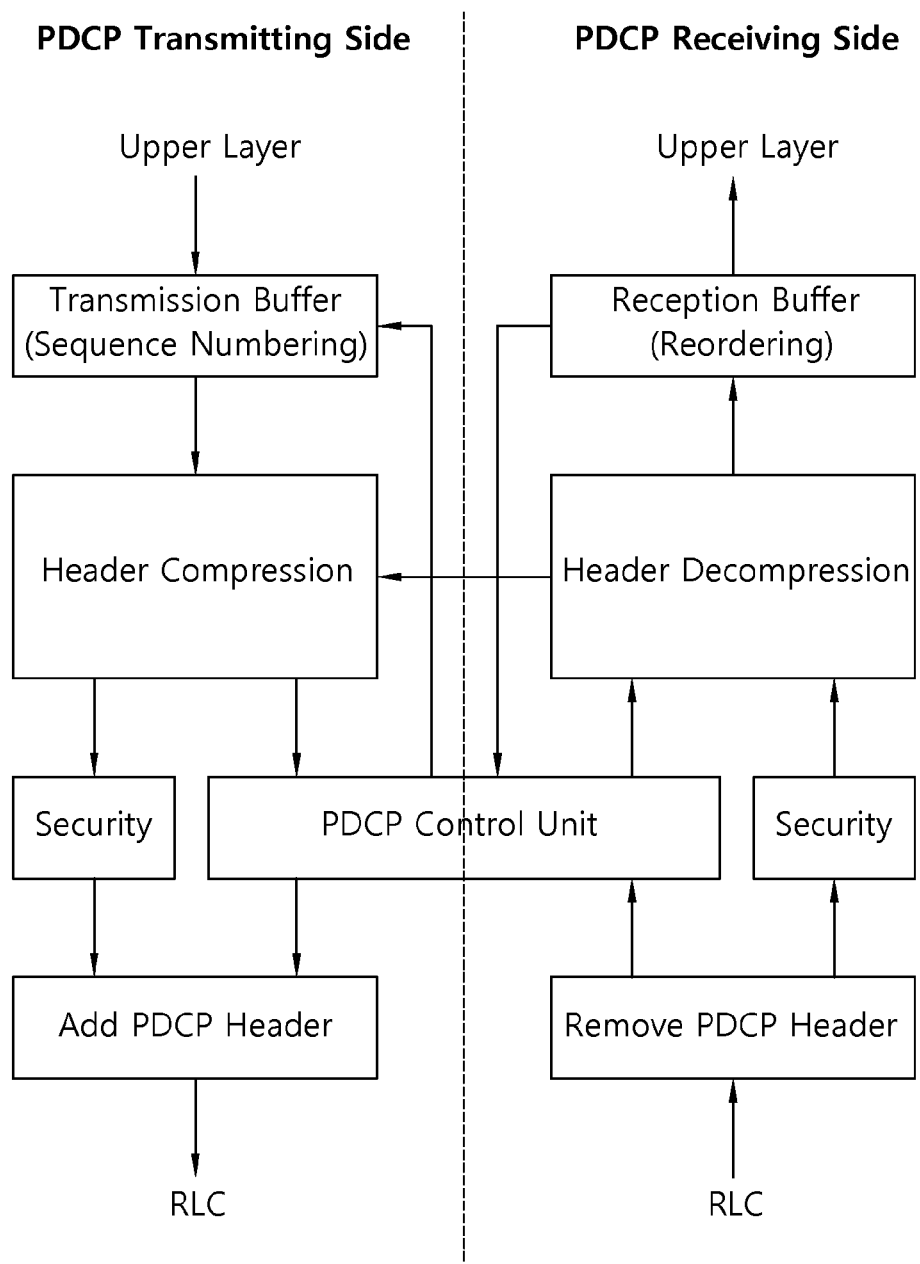
FIG. 4 shows an exemplary structure of PDCP layer.

FIG. 4 shows an exemplary structure of PDCP layer.

A PDCP layer is connected with an upper layer, i.e. a RRC layer or user application, and is also connected with a lower layer, i.e. RLC layer.

One PDCP layer may include a PDCP transmitting side and a PDCH receiving side. The PDCP transmitting side may construct a PDCP PDU by using SDUs received from the upper layer and/or control information generated by the PDCP layer itself. The PDCP PDU is sent to the PDCH receiving side which extracts the SDUs and/or the control information.

There are two types of PDCP PDU: PDCP Data PDU and PDCP Control PDU. The PDCP Data PDU may be a data block constructed by the PDCP layer from the SDU(s) received from the upper layer. The PDCP Data PDU may be generated at SRB and/or DRB. The function of Header Compression is provided to DRB and the function of Integrity Protection is provided to SRB. The Cyphering which keeps data security is provided to both SRB and DRB.

The PDCP Control PDU may be a data block carrying the control information and may be generated at DRB. The PDCP Control PDU includes a PDCP Status PDU and header compression control information.

Figure 5:
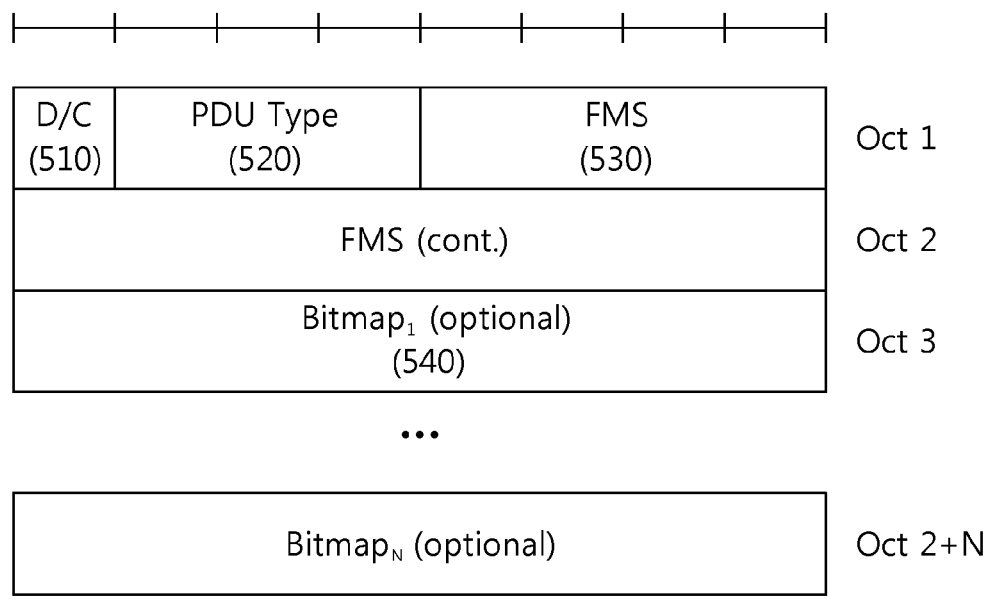
FIG. 5 shows an exemplary structure of PDCP Status PDU.

FIG. 5 shows an exemplary structure of PDCP Status PDU.

A PDCP Status PDU is used to convey a PDCP status report indicating which PDCP SDUs are missing.

A D(Data)/C(Control) field 510 indicates that a corresponding PDU is a Control PDU or a Data PDU.

A PDU type field 520 indicates a type of PDCP Control PDU. For example, if the PDU type field 520 is set to '000', the PDCP Control PDU carries the PDCP status report. If the PDU type field 520 is set to '0001', the PDCP Control PDU carries header compression control information.

A First Missing Sequence number (FMS) field 530 indicated a Sequence Number (SN) of a first missing PDCP SDU.

A Bitmap field 540 has a variable length. The Most Significant Bit (MSB) of the first octet of the Bitmap field 540 indicates whether or not the PDCP SDU with the SN (FMS+1) modulo 4096 has been received and, optionally decompressed correctly. The Least Significant Bit (LSB) of the first octet of the Bitmap field 540 indicates whether or not the PDCP SDU with the SN (FMS+8) modulo 4096 has been received and, optionally decompressed correctly. If a bit of the Bitmap field 540 is set to '0', a corresponding SDU is missing. If a bit of the Bitmap field 540 is set to '1', a corresponding SDU is received and it does not need retransmission.

There is a demand from operators to assess actual Quality of Service (QoS) experienced by the end user. QoS verification is a technique to check whether the actual QoS to the end user meets the planning target.

One of parameters for QoS verification is a data volume. The data volume can be defined in terms of number of bytes of PDCP SDU in a logging period. The periodic logging of data volume for a given Data Radio Bearer can be used to derive the user throughput. A UE reports the data volume. A BS calculates the UE's throughput based on the data volume. An operators performs cell capacity optimization based in the the UE's throughput.

The data volume may be calculated based on PDCP SDU(s) that may be related to actual user throughput most closely. For downlink QoS verification, a UE may calculate an amount of PDCP SDU which is successfully received from a BS. For uplink QoS verification, a UE may calculate an amount of PDCP SDU which is successfully transmitted to a BS.

Another parameter for QoS verification is a QoS benchmarking map. The QoS benchmarking map is used to verify actual throughput which is guaranteed to the UE at each location of a cell and is used to check how much amount of data is uploaded or downloaded at each location of the cell. From the view of operators, it is important to get accurate QoS benchmarking map in order to guarantee proper QoS.

UE's location information has been reported to a network in various ways. For example, the UE's location information is used to manage UE's paging group. The location information is transmitted as a Radio Resource Control (RRC) message and is not related to data volume or QoS verification.

Generally, a RRC messages is transmitted via a SRB and user data is transmitted via a DRB. It is hard to find any relationship between location information transmitted via the SRB and PDCP SDUs transmitted via the DRB. This means the QoS benchmarking map based on the conventional location information and the data volume may not be accurate enough to provide QoS at each location.

It is proposed that a network can acquire the location information via a DRB which is associated with the data volume.

Figure 6:
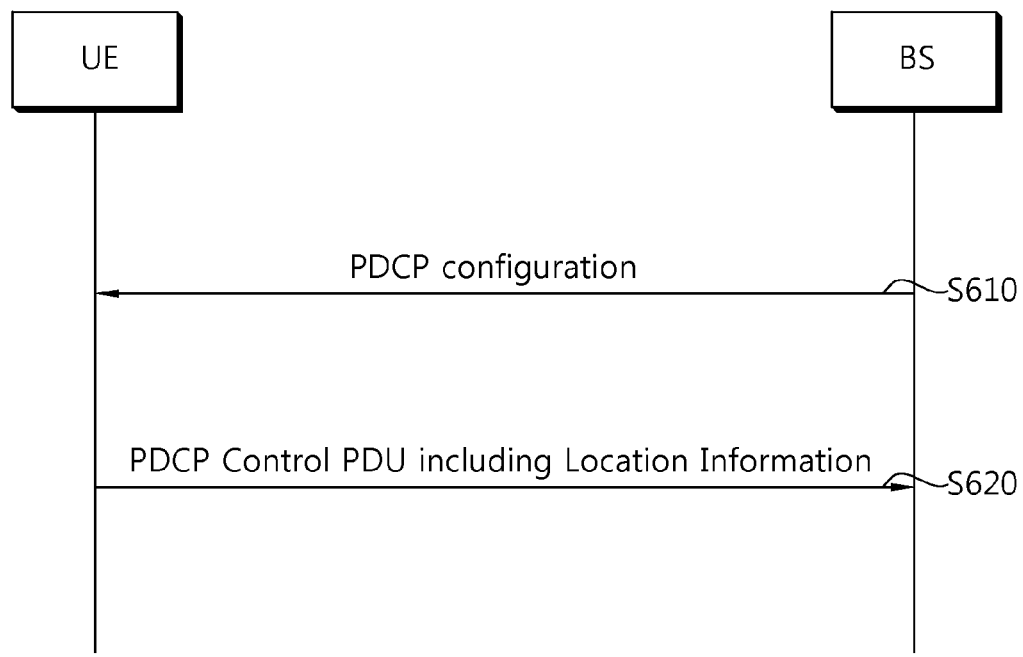
FIG. 6 is a flowchart showing a method for reporting location information according to an embodiment of the present invention.

FIG. 6 is a flowchart showing a method for reporting location information according to an embodiment of the present invention.

In step S610, a UE receives a PDCP configuration from a BS. The PDCP configuration may enable the UE to report a PDCP control PDU that includes location information. The PDCP configuration may be associated with at least one DRB which is mapped on RLC UM or RLC AM.

In step S620, the UE transmits a PDCP control PDU to the BS. The PDCP control PDU includes location information. For the BS to identify the location of the UE that downloads the data, the location information is provided to the BS.

The location information can be obtained from a GPS module arranged in the UE. The location information may include at least one of a latitude, a longitude and an altitude. Each time the UE sends the PDCP control PDU, updated location information may be fetched from the GPS module to inform the latest location of the UE. When the PDCP control PDU is received, the BS may consider that only the PDCP SDUs associated with the PDCP status report are received at the location indicated by the location information.

The PDCP configuration may include a periodicity of the PDCP control PDU. The PDCP control PDU may be transmitted periodically according to the periodicity.

The PDCP configuration may include a triggering condition for reporting the PDCP control PDU. When the triggering condition is satisfied, the PDCP status report can be transmitted.

The PDCP control PDU is transmitted as a response of a request from the BS. After receiving the request, the UE may send the PDCP control PDU. The BS may send the request as a PDU control PDU that indicates a request of location information.

When the UE receives the request, the UE sends the PDCP control PDU once. Or the UE sends the PDCP control PDU a predetermined times. The UE sends the PDCP control PDU periodically or non-periodically until a stop command is received from the BS. The request message may include at least one of a transmission period, a transmission duration and a number of transmission.

The UE may send the location information when the location of UE is changed. When current location is out of a predefined range, the UE may send the updated location information.

Figure 7:
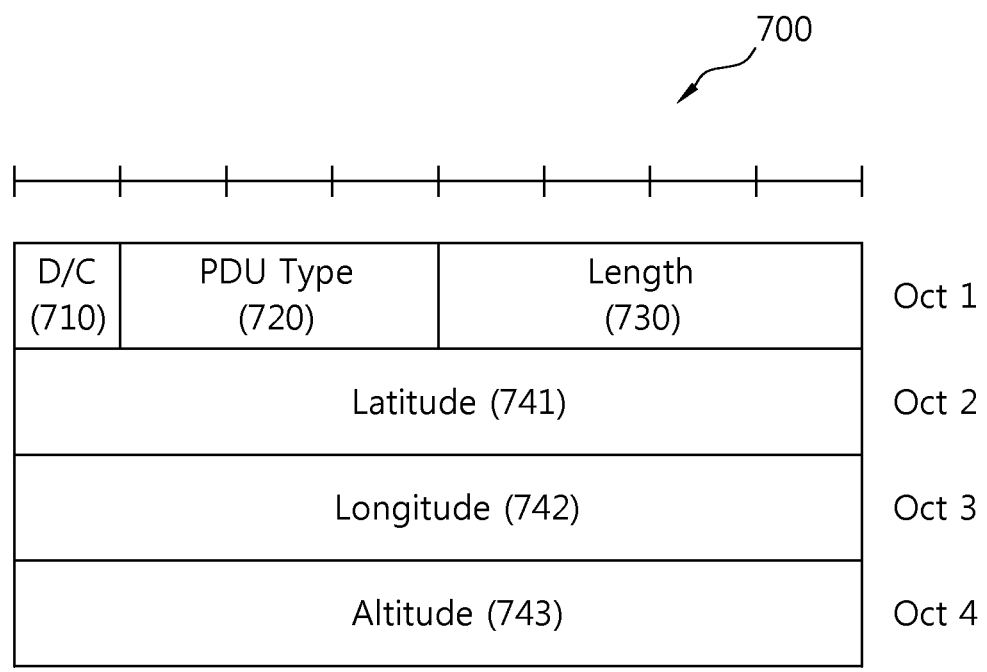
FIG. 7 shows an exemplary structure of PDCP control PDU according to an embodiment of the present invention.

FIG. 7 shows an exemplary structure of PDCP control PDU according to an embodiment of the present invention.

A PDCP control PDU 700 is used to convey location information of the UE.

A D/C field 710 indicates that a corresponding PDU is a Control PDU.

A PDU type field 720 indicates a type of PDCP Control PDU 700. For this example, if the PDU type field 720 may be set to '010', the PDCP Control PDU 700 carries location information.

A Length field 730 indicates a length in bytes of the corresponding PDCP Control PDU 700.

Location information includes a latitude 741, a longitude 742 and an altitude 743.

Figure 8:
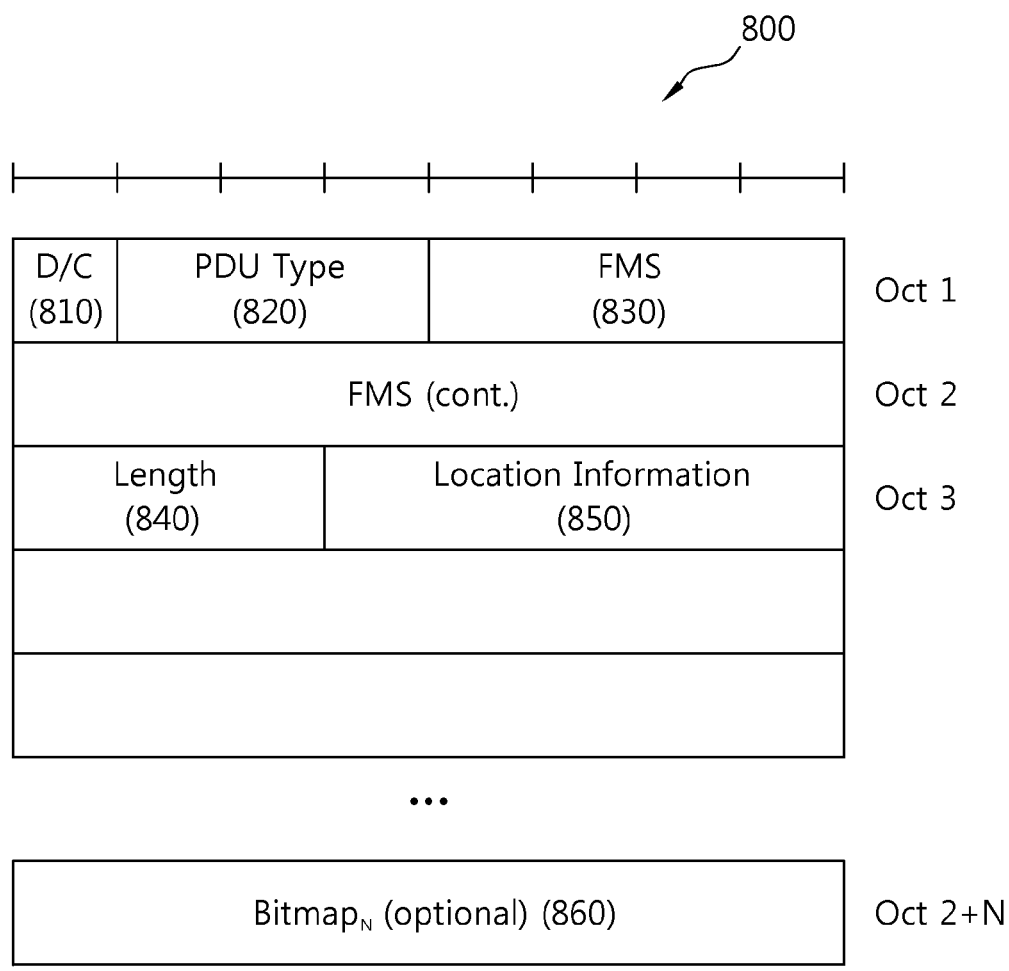
FIG. 8 shows an exemplary structure of PDCP control PDU according to another embodiment of the present invention.

FIG. 8 shows an exemplary structure of PDCP control PDU according to another embodiment of the present invention.

This PDCP Control PDU 800 is a combination of PDCP Control PDUs shown in FIGS. 5 and 7. Location information and PDCP status report are transmitted in one PDCP control PDU.

A D/C field 810 indicates that a corresponding PDU 800 is a Control PDU.

A PDU type field 820 indicates a type of PDCP Control PDU 800. For this example, if the PDU type field 820 may be set to '011', the PDCP Control PDU 800 carries location information and PDCP status report.

A Length field 840 indicates a length in bytes of the corresponding PDCP Control PDU 800.

Location information 850 carries the UE's location information.

A FMS field 830 indicated a SN of a first missing PDCP SDU. A Bitmap field 860 has a variable length.

The multiple pairs of PDCP status report and location information may be aggregated in one PDCD Control PDU.

The embodiments are not limited to the exemplary PDCP control PDUs shown in FIGS. 7 and 8. The size of each field may vary and the order of fields may be changed. Not all fields are necessary. One or more fields can be omitted.

Figure 9:
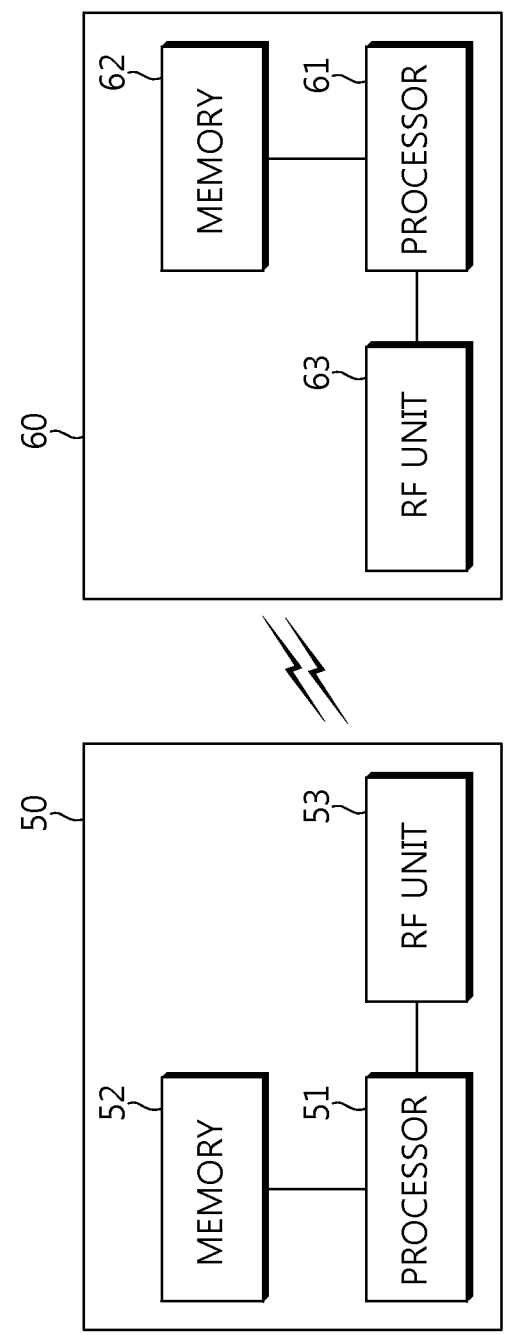
FIG. 9 is a block diagram showing a wireless communication system to implement the embodiments of the present invention.

FIG. 9 is a block diagram showing a wireless communication system to implement the embodiments of the present invention.

ABS 50 includes a processor 51, a memory 52, and a radio frequency (RF) unit 53. The memory 52 is coupled to the processor 51, and stores a variety of information for driving the processor 51. The RF unit 53 is coupled to the processor 51, and transmits and/or receives a radio signal. The processor 51 implements the proposed functions, procedures, and/or methods. The processor 51 can implement an operation of the BS according to the embodiments of FIG. 6.

A wireless device 60 includes a processor 61, a memory 62, and an RF unit 63. The memory 62 is coupled to the processor 61, and stores a variety of information for driving the processor 61. The RF unit 63 is coupled to the processor 61, and transmits and/or receives a radio signal. The processor 61 implements the proposed functions, procedures, and/or methods. The processor 61 can implement an operation of the UE according to the embodiments of FIG. 6.

The processor may include application-specific integrated circuit (ASIC), other chipset, logic circuit and/or data processing device. The memory may include read-only memory (ROM), random access memory (RAM), flash memory, memory card, storage medium and/or other storage device. The RF unit may include baseband circuitry to process radio frequency signals. When the embodiments are implemented in software, the techniques described herein can be implemented with modules (e.g., procedures, functions, and so on) that perform the functions described herein. The modules can be stored in memory and executed by processor. The memory can be implemented within the processor or external to the processor in which case those can be communicatively coupled to the processor via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for reporting location information in a wireless communication system, performed by a wireless device, the method comprising:

transmitting a Packet Data Convergence Protocol (PDCP) control Protocol Data Unit (PDU) to a base station, wherein the PDCP control PDU includes a D(Data)/C (Control) field indicating a control PDU, a PDU type field indicating location information and the location information of the wireless device.

2. The method of claim 1, wherein the PDCP control PDU is transmitted periodically.

3. The method of claim 1, wherein the PDCP control PDU is transmitted after receiving a request from the base station.

4. The method of claim 1, wherein the PDCP control PDU is transmitted when a location of the wireless device is changed.

5. The method of claim 1, wherein the PDCP control PDU further includes a length field indicating a length in bytes of the PDCP control PDU.

6. The method of claim 1, wherein the location information includes a latitude, a longitude and an altitude.

7. The method of claim 1, wherein the PDCP control PDU further includes a field indicating a Sequence Number (SN) of a first missing PDCP SDU.

8. A wireless device configured for reporting location information in a wireless communication system, the wireless device comprising:

a radio frequency unit configured to receive and transmit a radio signal; and a processor, operably coupled with the radio frequency unit, configured to transmit a Packet Data Convergence Protocol (PDCP) control Protocol Data Unit (PDU) to a base station, wherein the PDCP control PDU includes a D(Data)/C (Control) field indicating a control PDU, a PDU type field indicating location information and the location information of the wireless device.

9. The wireless device of claim 8, wherein the PDCP control PDU is transmitted periodically.

10. The wireless device of claim 8, wherein the PDCP control PDU is transmitted after receiving a request from the base station.

11. The wireless device of claim 8, wherein the PDCP control PDU is transmitted when a location of the wireless device is changed.

12. The wireless device of claim 8, wherein the PDCP control PDU further includes a length field indicating a length in bytes of the PDCP control PDU.

13. The wireless device of claim 8, wherein the location information includes a latitude, a longitude and an altitude.

14. The wireless device of claim 8, wherein the PDCP control PDU further includes a field indicating a Sequence Number (SN) of a first missing PDCP SDU.

* * * * *